Figure 1:
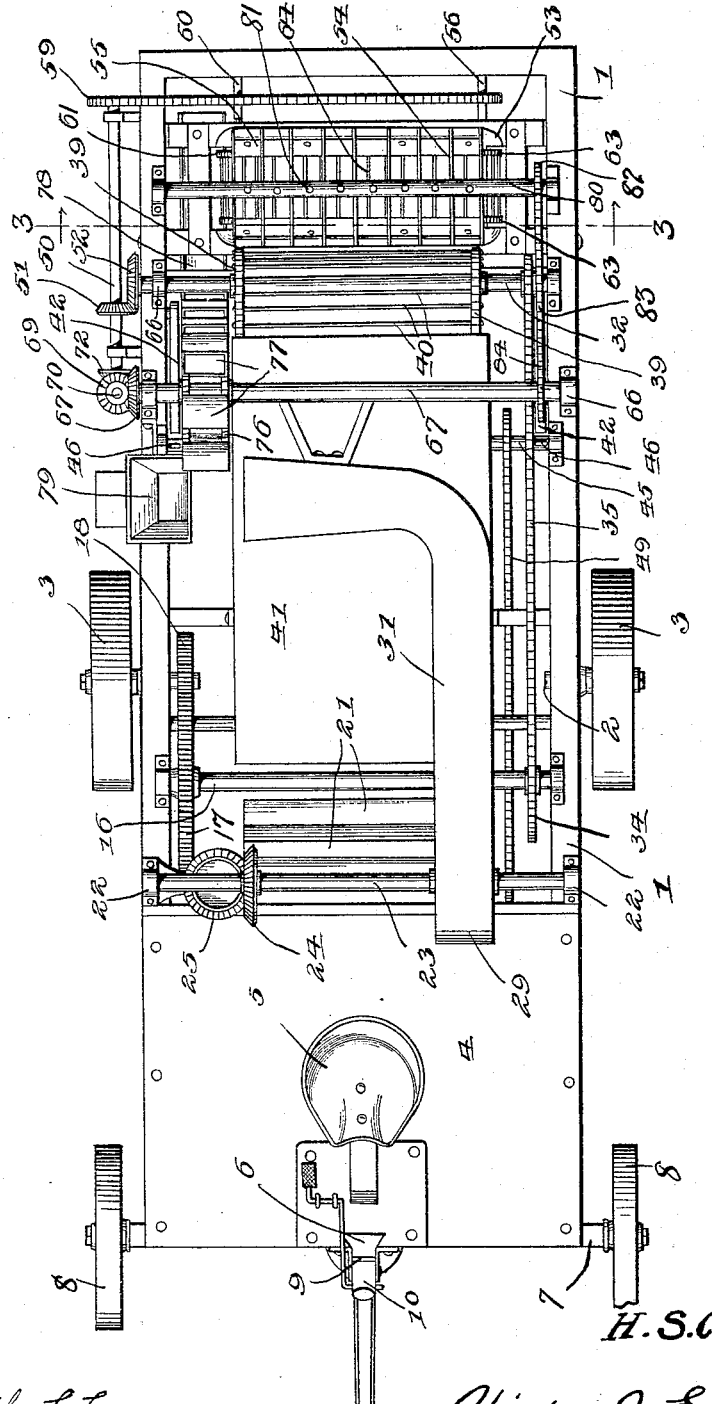

H. S. CROZIER.
SEPARATING MECHANISM.
APPLICATION FILED APR. 7, 1914.

1,177,995.

Patented Apr. 4, 1916.
2 SHEETS—SHEET 1.

Witnesses
Frederick L. Fox.
K. Peacock

Inventor
H. S. Crozier.
By Victor J. Evans.
Attorney

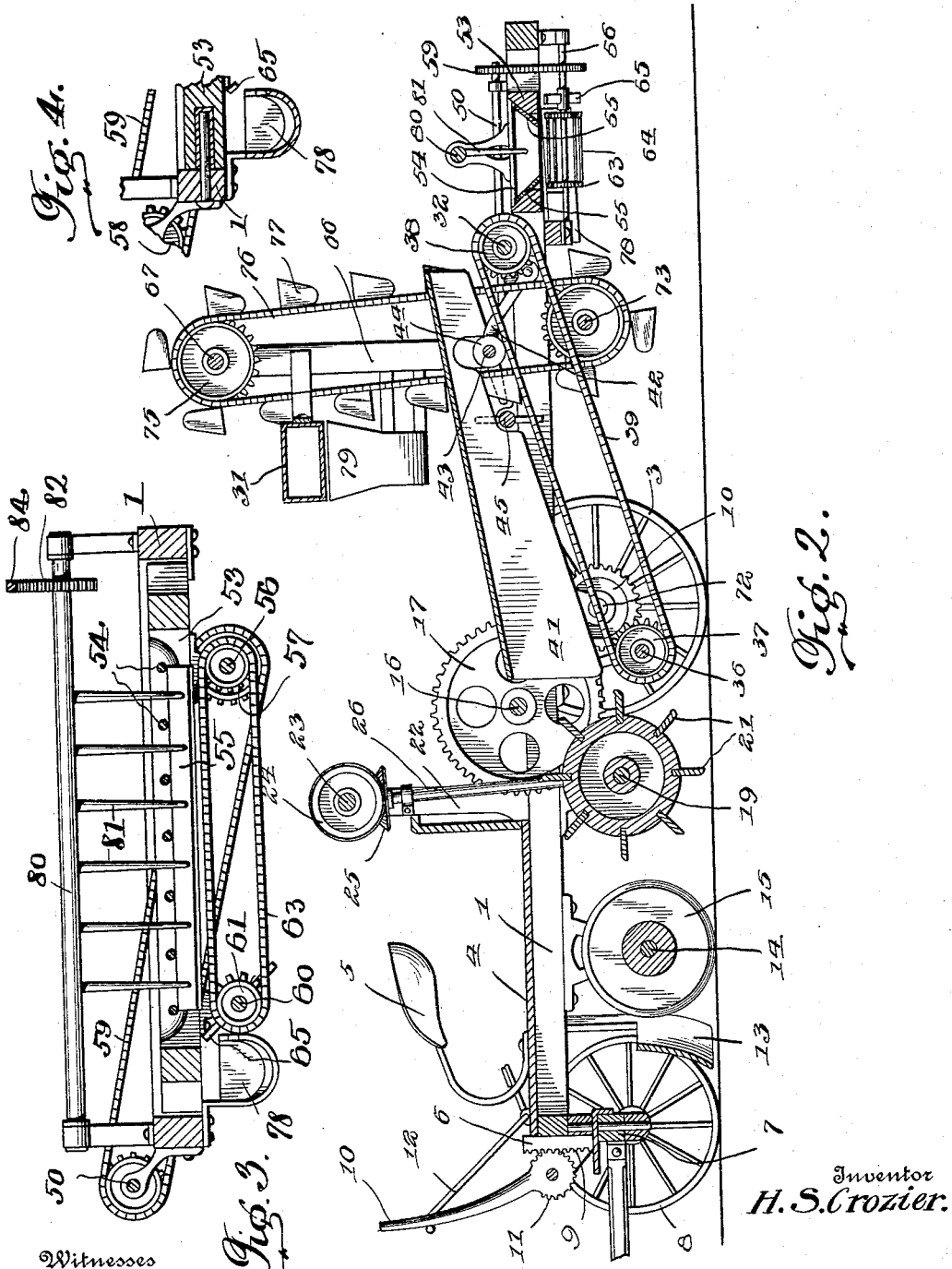

UNITED STATES PATENT OFFICE.

HENRY S. CROZIER, OF HEADLAND, ALABAMA.

SEPARATING MECHANISM.

1,177,995.   Specification of Letters Patent.   Patented Apr. 4, 1916.

Application filed April 7, 1914. Serial No. 830,229.

*To all whom it may concern:*

Be it known that I, HENRY S. CROZIER, a citizen of the United States, residing at Headland, in the county of Henry and State of Alabama, have invented new and useful Improvements in Separating Mechanism, of which the following is a specification.

This invention relates to separating mechanism for peanut harvesters and it consists in the novel features hereinafter described and claimed.

An object of the invention is to provide a machine of simple structure adapted to be drawn over the ground and which includes means for cutting the vines which means are also adapted to pulverize the soil and bring the peanuts near the surface of the same. In advance of the said vine cutting device is located a sweep adapted to brush the surface stones to one side and out of the path of the said vine cutting device. The machine is also provided at a point behind the said vine cutting means with a digger journaled for rotation at a relatively rapid rate of speed. An elevator and sifter is mounted for movement behind the said digger and a hood is located above the same. The digger is adapted to direct the material toward the hood from which it may rebound upon the elevator and sifter where the fine particles of dirt and sand are separated from the peanuts and gravel and the said peanuts and gravel are carried up and delivered upon a second sifter. Means are provided for agitating both of the said sifters and a rake is rotatably mounted above the last mentioned sifter and is adapted to move the particles of vine from the peanuts. The peanuts and gravel are delivered to an elevator and a fan is mounted upon the frame of the machine and is adapted to deliver a blast of air transversely across the delivery end of the elevator. A hopper is located below the delivery end of the elevator and the peanuts are blown into the hopper while the gravel falls vertically from the delivery end of the said elevator to the ground.

In the accompanying drawing:—Figure 1 is a top plan view of the harvester. Fig. 2 is a longitudinal sectional view of the harvester. Fig. 3 is a transverse sectional view of the rear portion of the same cut on the line 3—3 of Fig. 1. Fig. 4 is a detail sectional view of parts of the harvester.

The harvester comprises a frame 1 having located at a point between its forward and rear end stub axles 2 upon which are mounted ground wheels 3. One of the said wheels is fixed with relation to the axle while the other wheel is loosely journaled thereon.

A platform 4 is provided upon the forward end portion of the frame 1 and an operator's seat 5 is mounted upon the said platform. A standard 6 is slidably mounted for vertical movement at the forward end of the frame 1 and is pivoted at its lower end to the intermediate portion of an axle 7 the said axle carrying at its ends journaled wheels 8. The standard 6 is provided at its forward side with gear teeth 9 and a lever 10 is fulcrumed upon the frame 1 and is provided with teeth 11 which mesh with the teeth 9. It will be seen that by swinging the lever 10 the forward end portion of the frame 1 may be raised or lowered with relation to the surface of the ground and the upper end of the lever 10 may be held in an elevated position by means of a catch 12 mounted upon the forward portion of the frame 1 and which may be engaged with the said lever for the purpose of holding the same.

A sweep 13 is located under the forward portion of the frame 1 and is disposed at an acute angle to the line of draft of the machine and transversely across the same. The said sweep is adapted to encounter relatively large stone and other obstructions at the surface of the soil as the machine is moved over the same and the said sweep brushes the said obstructions to one side.

A shaft 14 is freely journaled for rotation under the frame 1 behind the sweep 13 and is provided with a series of parallel disks 15 which are disposed parallel with the line of draft of the machine. As the machine is drawn over the ground the said disks 15 cut into the soil and sever the vines and have a tendency to pulverize the soil and bring the peanuts nearer the surface thereof.

A shaft 16 is journaled for rotation upon the frame 1 and a relatively large gear wheel 17 is fixed to the said shaft and meshes with a gear wheel 18 fixed upon one axle 2. A shaft 19 is journaled for rotation under the intermediate portion of the frame 1 and a relatively small gear wheel 20 is fixed to the shaft 19 and meshes with the said gear wheel 17. Therefore it will be seen that as the shaft 16 is rotated at a relatively slow rate of speed the shaft 19 is rotated at a relatively rapid rate of speed. Digging blades 21 are mounted upon the shaft 19 and are disposed radially with relation to the shaft and parallel with relation to each other. As the shaft 19 is rotated the said blades 21 enter the soil and cast the peanuts, gravel and vines in an upward and rearward direction.

Standards 22 are mounted upon the intermediate portion of the frame 1 and a shaft 23 is journaled for rotation between the said standards 22. A beveled gear wheel 24 is fixed to the shaft 23 and meshes with a beveled gear wheel 25 carried by a vertically disposed shaft 26 journaled in suitable bearings carried by the frame of the machine. The shaft 26 is provided at its lower end with a beveled gear wheel 27 which meshes with a beveled gear wheel 28 fixed to the shaft 19. A fan casing 29 is supported between the standards 22 and fan blades 30 are located in the said casing and are mounted upon the shaft 23. A wind trunk 31 is connected with the fan casing 29.

A shaft 32 is journaled for rotation at the rear portion of the frame 1 and carries a sprocket wheel 33. A sprocket wheel 34 is mounted upon the shaft 16 and a sprocket chain 35 is trained around the sprocket wheels 33 and 34 and is adapted to transmit rotary movement from the shaft 16 to the shaft 32. A shaft 36 is journaled for rotation below the intermediate portion of the frame 1 and is provided with sprocket wheels 37. Sprocket wheels 38 are mounted upon the shaft 32 in alinement with the sprocket wheels 37 and chains 39 are trained around the alined sprocket wheels 37 and 38. The chains 39 are connected together by spaced bars 40 which constitute a combined elevator and conveyer. A hood 41 is supported upon the frame 1 above the upper run of the conveyer of which the chains 39 and bars 40 are component parts and the material that is passed by the digging blades 21 may strike against the under side of the said hood and rebound upon the upper run of the conveyer of which the bars 40 are parts. The upper run of the said conveyer moves rearwardly and in an upward direction consequently during the movement along the said conveyer some of the fine material is sifted from the coarser material and falls to the ground.

Arms 42 are pivotally connected at the inner sides of the side bars of the frame 1 and the free end portions of the arms 42 are connected together by a shaft 43 upon which are mounted rollers 44 the said rollers being vertically above the chains 39 and adapted to come in contact with the same. A shaft 45 is journaled for rotation upon the frame 1 and is provided with radially disposed arms 46 which are adapted to engage under the free end portions of the arms 42 when the shaft 45 is rotated and raise the arms 42 and drop the same whereby the rollers 44 may come forcibly in contact with the chains 39 and agitate the said chains and the bars 40 carried thereby whereby the sifting or separating of the coarse and fine material upon the bars 40 is facilitated. A sprocket wheel 47 is fixed to the shaft 45 and a sprocket wheel 48 is fixed to the shaft 19. A sprocket chain 49 is trained around the sprocket wheels 47 and 48 and is adapted to transmit rotary movement from the shaft 19 to the shaft 45.

A shaft 50 is journaled for rotation at the side of the frame 1 and carries a beveled gear wheel 51 which meshes with a beveled gear wheel 52 mounted upon the end of the shaft 32. A tray 53 is pivotally mounted upon the frame 1 behind the delivery end of the elevator operated by the shaft 32 and the said tray carries spaced bars 54 and inclined plates 55. A shaft 56 is journaled for rotation under one end of the tray 53 and is provided with a sprocket wheel 57. A sprocket wheel 58 is mounted upon the shaft 50 and a sprocket chain 59 is trained around the sprocket wheels 57 and 58 and is adapted to transmit rotary movement from the shaft 50 to the shaft 56. A shaft 60 is also journaled for rotation under the tray 53 and is provided with sprocket wheels 61. Sprocket wheels 62 are mounted upon the shaft 56 and sprocket chains 63 are trained around the alined sprocket wheels 61 and 62 and serve as means for rotating the shaft 60 from the shaft 56. The chains 63 are connected together by cross bars or slats 64 and the said chains and cross bars constitute a conveyer mounted for orbital movement below the tray 53. Radially disposed arms 65 are carried by the shaft 60 and are adapted to encounter the free edge portion of the tray 53 as the shaft 60 rotates and the free edge portion of the said tray is raised and permitted to fall whereby the tray is agitated and the material which is upon the surface of the tray is sifted.

Standards 66 are mounted upon the rear portion of the frame 1 and a shaft 67 is journaled for rotation at the upper ends of the said standards. The shaft 67 is provided at one end with a beveled gear wheel 68 which meshes with a beveled gear wheel 69 mounted at the upper end of a shaft 70 journaled for rotation at the side of one of the standards 66. A beveled gear wheel 71 is fixed to the lower end of the shaft 70 and meshes with a beveled gear wheel 72 fixed to the forward end of the shaft 50.

A shaft 73 is journaled for rotation below the rear portion of the frame 1 and carries sprocket wheels 74. Sprocket wheels 75 are mounted upon the shaft 67 and chains 76 are trained around the sprocket wheels 74 and 75. Buckets 77 are carried by the chains 76 and a chute 78 is arranged to deliver material into the buckets 77 which material is deposited into the said chute by the chains 63 and bars 64. Inasmuch as the said shaft 67 is rotated by means of the operative connections hereinbefore described the material is elevated and carried over the said shaft 67 and is cast in a downward direction toward a hopper 79 mounted upon one of the standards 66. The discharge end of the wind trunk 31 is disposed transversely across the upper end of the hopper 79 and transversely across the upper portion of the chain 76. The hopper 79 is a little to one side of the chain 76 consequently the air coming from the trunk 31 blows the peanuts which are dropped from the buckets 77 over into the hopper 79 while the gravel or stone is permitted to fall vertically to the surface of the ground.

A shaft 80 is journaled for rotation above the tray 53 and carries rake teeth 81. A sprocket wheel 82 is fixed upon the shaft 80 and a sprocket wheel 83 is fixed upon the shaft 70. A sprocket chain 84 is trained around the sprocket wheels 82 and 83 and is adapted to transmit rotary movement from the shaft 70 to the shaft 80. Consequently as the mixed material is deposited by the elevator which is operated by the shaft 32 upon the bars 54 of the tray 53 the teeth 81 carried by the shaft 80 rotate about the axis of the shaft and encounter the vines and sweep the same rearwardly beyond the rear end of the frame 1 while the peanuts and gravel may pass between the bars 54 and are carried by the bars 64 to the chute 78 and deposited therein. Therefore it will be seen that a peanut harvester of simple and efficient structure is provided and that the parts of the said harvester mutually coöperate with each other to remove the peanuts from the ground, and separate the sand and soil from the same, separate the vines from the same and also separate the peanuts from the stone and gravel and direct the peanuts in a hopper from which they may be permitted to fall into bags. When it is desired to transport machines from point to point the wheels 3 may be removed and wheels of larger size substituted in their stead and when this is done the machine may be readily moved and the parts carried by the frame will clear the surface of the ground.

Having described the invention what is claimed is:—

A separating mechanism comprising a frame, a tray pivotally mounted upon the frame, a shaft journaled under the tray and disposed transversely thereof, means for rotating the shaft, an arm carried by the shaft and engageable with the tray to vibrate the same, and a rake journaled for rotation above the tray.

In testimony whereof I affix my signature in presence of two witnesses.

HENRY S. CROZIER.

Witnesses:
C. E. WILLIAMS,
W. M. HARDWICK.

Copies of this patent may be obtained for five cents each, by addressing the "Commissioner of Patents, Washington, D. C."